United States Patent [19]

Nann

[11] Patent Number: 5,020,946
[45] Date of Patent: Jun. 4, 1991

[54] TOOL CHUCK COOLANT SYSTEM

[75] Inventor: Eugen Nann, Boettingen, Fed. Rep. of Germany

[73] Assignee: Simon Nann KG, Fabrik fuer Spannwerkzeuge, Boettingen, Fed. Rep. of Germany

[21] Appl. No.: 442,134

[22] Filed: Nov. 28, 1989

[51] Int. Cl.$^5$ .............. B23B 31/20; B23B 51/06; B23C 5/28
[52] U.S. Cl. .............. 409/136; 277/212 F; 279/1 ME; 279/1 Q; 279/20; 279/46 R; 279/48; 407/11; 408/57; 409/234
[58] Field of Search .......... 279/20, 1 ME, 1 Q, 46 R, 279/51, 52, 48; 408/56, 57, 59; 409/135, 136, 234, 232; 277/212 C, 212 F; 407/11

[56] References Cited

U.S. PATENT DOCUMENTS 3,905,609  9/1975  Sussman .............. 279/20

FOREIGN PATENT DOCUMENTS 129816  1/1946  Australia .............. 277/212 F

Primary Examiner—Steven C. Bishop
Attorney, Agent, or Firm—Eugene E. Renz, Jr.

[57] ABSTRACT

A tool chuck assembly comprising a collet having a bore for supporting a tool, a collet holder having a portion circumscribing the collet, a tension nut cooperatively associated with the collet holder to mount and dismount a tool means defining a coolant channel in the collet holder, a sealing element mounted in the collet having a first peripheral sealing surface (8) engaging the inner wall of the collet holder to form a seal behind the collet and a second peripheral sealing surface engagably with the outer periphery of the tool to form a seal therewith.

11 Claims, 2 Drawing Sheets

TOOL CHUCK COOLANT SYSTEM

FIELD OF THE INVENTION

The present invention relates to improvements in tool chucks having an internal coolant system.

BACKGROUND OF THE INVENTION

Tool chucks of the type to which the present invention relate typically comprise a collet having a bore for supporting a tool, a collet holder having a portion circumscribing the collet and a tension nut cooperatively associated with the collet holder for mounting and dismounting a tool in the collet. Chucks of this type are not new per se. U.S. Pat. No. 3,024,030 shows an assembly of this general configuration. The assembly further includes a sealing element such as an O-ring inserted between the rear axial end surface of the tool shaft and the axial end surface of the collet holder through which the coolant channel emerges. The O-ring provides a seal for the coolant which is supplied through the coolant channel of the collet holder to the shaft of the tool and normally prevents the coolant from escaping to the outside on the tool shaft in the area of the collet or through the slots in the collet.

In the chuck assembly described above, the tool is supported axially in the collet holder by the elastically deformable O-ring sealing element. Thus, differences in the degree of axial compression of the sealing element produces a difference in the distance to which the tool projects out of a chuck. This in turn results in a lack of machining precision in the axial direction. For example, the depths of the series of holes can vary by reason of this condition. Moreover, in numerically controlled machine tools, it is standard practice to cut different axial lengths e.g. to drill holes at various depths with the same tools, such as tools of the same length and to produce the different axial cutting distances desired by inserting a stop into the internal axial end surface of the collet holder which provides axial support to the shaft of the tool. Consequently, the tool is gripped at different axial positions in the chuck. In this instance in order to provide an adequate seal, it is necessary to provide two seals, one seal between the collet holder and the stop and another seal between the stop and the shaft of the tool. This not only increases the cost of the overall assembly but magnifies the axial machining errors caused by compression of two sealing elements in a cumulative manner.

West German Utility Model No. 70-26,156 shows a seal for an internal coolant supply system which comprises filling slots in the collet with rubber or an elastic grade of plastic. Even though the slots in the collet can be sealed in this fashion, it can be found that the seal between the collet and collet holder as well as between the collet and the tool are both inefficient. Further even though relatively large amounts of sealing material in the slots improve the sealing effect, it also causes considerable frictional resistance to the chucking of the tool and thus impairs the clamping action. While smaller amounts of sealant improve the chucking characteristic, the danger of leakage occurs more quickly in this event.

SUMMARY OF THE INVENTION

The foregoing in mind, it is an object of the present invention to provide a seal for a tool chuck which has an internal cooling system which overcomes the disadvantages and drawbacks of prior sealing arrangements discussed above by not only providing an effective sealed environment but also allows for the precise positioning of the tool. To this end, in accordance with the present invention, the sealing element is mounted in the collet and has a first peripheral sealing surface which engages the inner wall of the collet holder to form a seal behind the collet and a second peripherally extending sealing surface engageable with the outer periphery of the tool to form a seal with the tool. Thus, sealing is accomplished independently of the axial position of the tool and the chuck. The axial end face of the tool shaft is supported in the rearmost axial position directly on an axial end surface or collar of the collet holder or against a stop inserted into the end surface thereof. In this manner, a firm metal to metal support is provided for the tool which guarantees precise axial positioning of the tool. In accordance with the seal of the present invention, even if a stop is inserted between the axial end surface of the tool shaft and the collet holder to provide for precise axial positioning of the tool, it does not require an additional seal.

The seal of the present invention can be adapted to the requirements for the assembly in question. For example, in some instances, the shafts of the tool do not rest against the rear end surface of the collet holder. In this case the collet can be designed advantageously with an expanded cylindrical recess at its rear end for receiving the front part of the sleeve shaped sealing element wherein the rear part forms a seal against the internal wall of the collet holder. In another instance, if in the clamped state the shaft of the tool extends all the way to the end of the collet holder, the sealing element can also be designed in the form of a ring.

As noted above, the external sealing surface of the sealing element always forms a seal against the collet holder behind the collet. In the preferred embodiment, the sealing surface is designed as sealing lip which is easily compressed radially by the collet holder and thus rests under pressure to form a seal against the internal wall of the holder. The internal sealing surface is also preferably designed as a sealing lip so that when the tool is inserted, the lip is spread and rests under radial pressure against the shaft of the tool. The position of the internal sealing surface depends on the geometric conditions, particularly, on the length and diameter of the shaft of the tool. Thus, the internal sealing surface is usually located at the front terminal end of the elongated sealing element. However, it can also be located axially adjacent the external sealing surface or even axially behind that surface.

The sealing element may be made of a variety of flexible elastic materials. In its preferred form, the sealing element consists of an elastic grade of plastic, such as polyethylene, polypropylene, polyurethane, polytetrafluoroethylene, neoprene, acrylonitrile, or ethylene-propylene.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
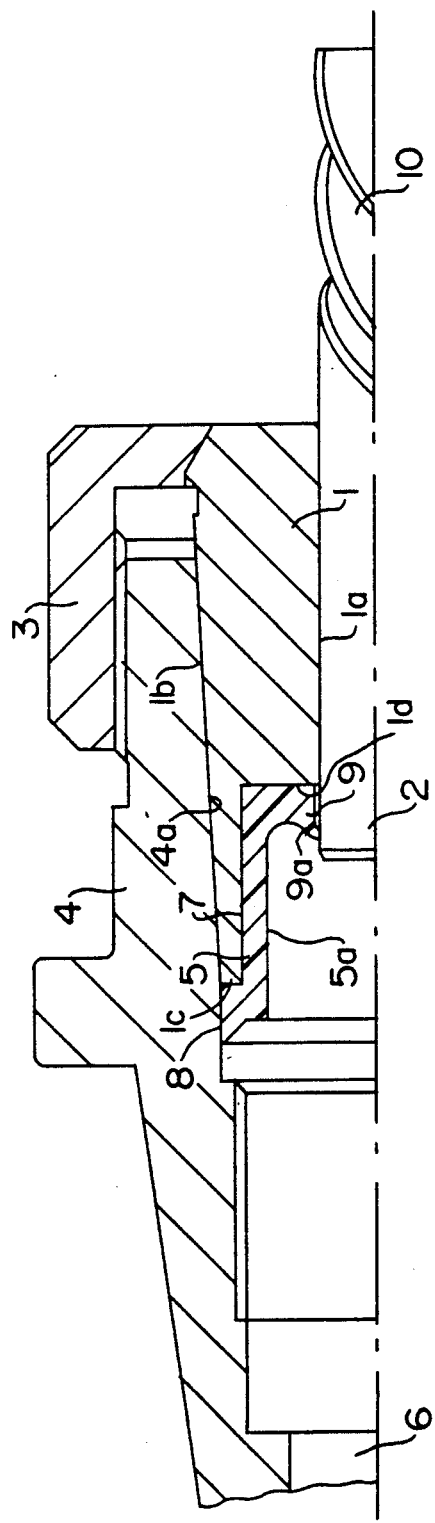
FIG. 1 is a longitudinal sectional view through a chuck assembly showing a seal constructed in accordance with the present invention.

The chuck assembly is of generally conventional construction comprising a generally tubular collet 1 having an internal bore 1a and tapered outer peripheral surface 1b, an elongated collet holder 4 having a tapered inner peripheral bore 4a at one terminal end complementing the collet outer surface and circumscribing the same and a tension nut 3 having internal screw threads for selectively tightening and loosening the collet holder 4 on the tapered outer surface of the collet. As is conventional chucking, is accomplished by tightening the tension nut 3. As illustrated, collet holder 4 has an axial channel 6 formed therein for conducting coolant to the shaft 2 of the tool 10.

In accordance with the present invention, sealing means is provided for sealing the assembly and preventing escape of the coolant through the collet. To this end, the seal comprises an elongated sleeve shaped sealing element 5 having a generally cylindrical body portion 5a and an outwardly directed circumferentially extending first sealing lip 8 at one end which as illustrated forms a seal against the inside wall of the collet holder 4 behind collet 1. As illustrated the outer sealing surface 8 continues as a thin sealing lip which tapers to a sharp edge at the end and rests to form a seal against the inside wall of the collet holder 4. The cylindrical body 5a of the sealing element fits in the cylindrical recess 7 in collet 1. Note the radially outwardly directed rib 8 overlies the inner axial end face 1c of collet 1. At the opposite axial end of the body portion 5a of sealing element 5 or the front end thereof, a radially inwardly directed sealing lip 9 is provided which as illustrated confronts and engages the radial shoulder 1d in the collet 1. The sealing lip 9 is formed so that it has a rearwardly projecting edge 9a which points backward and expands when the shank of the tool is inserted so that the lip rests with pressure and forms a seal against the peripheral surface of the shank of the tool in the manner illustrated.

Figure 2:
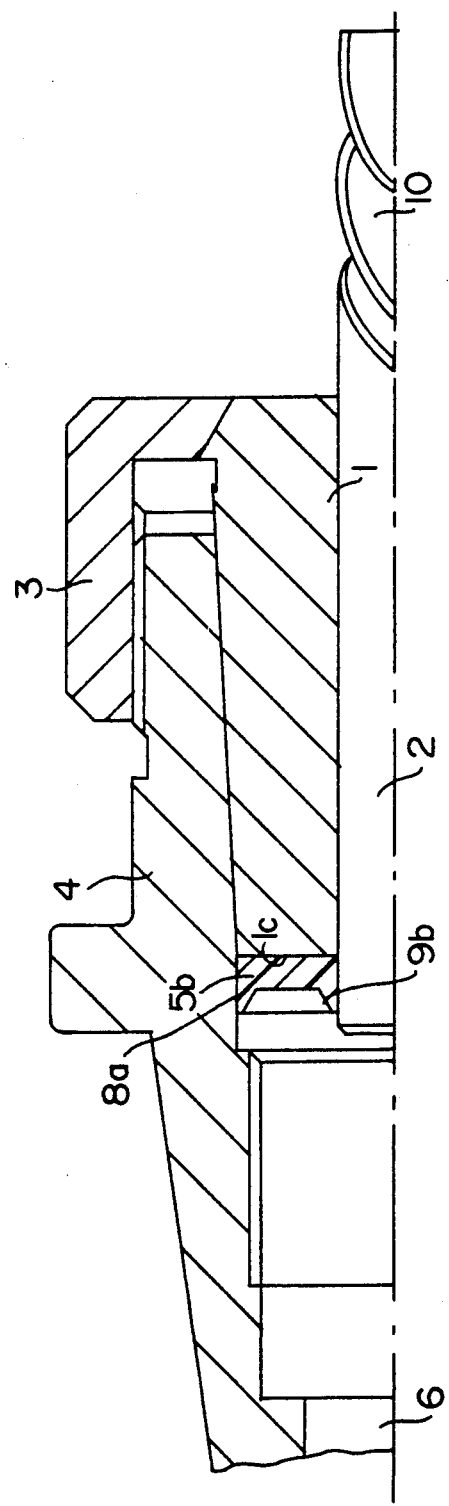
FIG. 2 is a view similar to FIG. 1 showing a modified form of sealing member.

There is shown in FIG. 2 a modified form of sealing element in accordance with the present invention, which comprises a sealing ring 5b having axially directed annular sealing ribs 8a and 9b engaging the collet holder 4 and collet 1 respectfully. The sealing ring 5b abuts the inner axial end face 1c of the collet 1.

A sealing element in accordance with the present invention as described above may be made of a variety of plastic materials such as polyethylene, polypropylene, polyurethane, polytetrafluoroethylene, neoprene, acrylonitrile, or ethylenepropylene so that it can produced as a simple injection molded part.

Even though particular embodiments of the invention have been illustrated and described herein, it is to be understood that changes and modifications may be made therein with the scope of the following claims.

What is claimed is:

1. A tool chuck assembly comprising a collet having a bore for supporting a tool, a collet holder having a portion circumscribing said collet, a tension nut cooperatively associated with said collet holder to mount and dismount said tool, means defining a coolant channel in said collet holder, a sealing element mounted in said collet having a first peripheral sealing surface (8) engaging the inner wall of said collet holder to form a seal behind said collet and a second peripheral sealing surface (9) engageable with the outer periphery of said tool to form a seal therewith, and means mounting said sealing element relative to said collet holder and said collet, such that a substantially uniform and constant seal pressure is produced between said tool and said peripheral sealing surface (8, 9) regardless of the seating pressure of said collet, said collet holder and said tool relative to one another.

2. Tool chuck according to claim 1, wherein said sealing element (5) is in the form of a sleeve.

3. Tool chuck according to claim 1, wherein said sealing element (5) is in the shape of a ring.

4. Tool chuck according to claim 2, wherein said collet (1) has on the inside an expanded cylindrical coaxial recess (7), at its rear axial end to hold the sealing element(5).

5. Tool chuck according to claim 4 wherein said sealing element (5) comprises a front cylindrical part, having an outer diameter fitted to the recess (7) in the collet (1), and a rear part having a diameter, the external surface of which forms the outer sealing surface (8).

6. Tool chuck according to claim 1, wherein the internal sealing surface (9) of the sealing element (5) is provided at the front end of the sealing element.

7. Tool chuck according to claim 1, wherein the internal sealing surface (9) of the sealing element (5) has a sealing lip.

8. Tool chuck according to claim 1, wherein the sealing element (5) consists of an elastic plastic.

9. A tool chuck assembly comprising a collet having a stepped bore for supporting a tool and a cylindrical recess (7), a collet holder having a portion circumscribing said collet, a tension nut cooperatively associated with the collet holder to mount and dismount said tool, means defining a coolant channel in said collet holder, an elongated sealing element (5) mounted in said cylindrical recess (7), said sealing element (5) having a first peripheral sealing surface (8) overlying the inner axial end face (1c) of said collet and engaging the inner wall of said collet holder to form a seal behind said collet, and a second peripheral sealing surface (9) confronting and engaging the radial shoulder (1c) of said cylindrical recess (7) and engageable with the outer periphery of said tool to form a seal therewith, and means mounting said sealing element relative to said collet holder and said collet such that a uniform and constant seal pressure is produced between said tool and said second peripheral sealing surface (9) regardless of the seating pressure upon assembly of said collet, said collet holder and said tool.

10. Tool chuck according to claim 9, wherein said sealing surface (9) of said sealing element (5) has a sealing lip.

11. Tool chuck according to claim 9, wherein said sealing element (5) consists of an elastic plastic.

* * * * *